United States Patent [19]

Braeger

[11] Patent Number: 5,288,264
[45] Date of Patent: Feb. 22, 1994

[54] APPARATUS FOR SKINNING FISH FILLETS

[75] Inventor: Horst H. Braeger, Lübeck, Fed. Rep. of Germany

[73] Assignee: Nordischer Maschinenbau Rud.Baader GmbH + Co KG, Lübeck, Fed. Rep. of Germany

[21] Appl. No.: 971,086
[22] Filed: Nov. 4, 1992

[30] Foreign Application Priority Data

Nov. 6, 1991 [DE] Fed. Rep. of Germany ....... 4136459

[51] Int. Cl.$^5$ .................. A22C 25/17; A22B 5/16; B26D 7/02
[52] U.S. Cl. ...................................... 452/127; 83/700; 83/858
[58] Field of Search ............... 452/127, 125, 135, 136; 83/698, 700, 856, 858

[56] References Cited

U.S. PATENT DOCUMENTS

| 4,466,344 | 8/1984 | Schill | 452/127 |
| 4,606,093 | 8/1986 | Townsend | 452/127 |
| 4,649,604 | 3/1987 | Braeger | 452/127 |
| 4,793,026 | 12/1988 | Braeger et al. | 452/127 |
| 5,211,097 | 5/1993 | Grasselli | 452/127 |

FOREIGN PATENT DOCUMENTS

| 2118164 | 10/1973 | Fed. Rep. of Germany. |
| 3700324 | 8/1987 | Fed. Rep. of Germany. |
| 3716037 | 2/1988 | Fed. Rep. of Germany ...... 452/125 |
| 2451253 | 10/1980 | France ................. 452/127 |

Primary Examiner—Willis Little
Attorney, Agent, or Firm—Fay, Sharpe, Beall, Fagan, Minnich & McKee

[57] ABSTRACT

An apparatus for skinning fish fillets having the roller-presser shoe-structure comprises an oscillating knife (17) is particularly appropriate for skinning fillets of flatfish, i.e. fillets of fish which show a rather intimate and close connection between the skin and the muscle meat at least partially caused by fine tendons. In order to improve the insufficient yield in fillet meat caused by the structure of such machines, and in order to obtain a remaining of the so-called silver mirror on the fillet meat, the presser shoe (6) carrying and guiding the oscillating knife (17) is arranged to pivot about the axis (9) of the roller (3) against spring force, and the pivoting movement is used for retracting the oscillating knife (17), so that the cutting edge (19) thereof comes to lie behind a stationary cutting edge (13) formed on the presser shoe (6) at the entrance side thereof. Thereby, a change of the type of skinning cut occurs during the skinning after the initiating cutting by the oscillating knife (17) by the presser shoe (6) being entrained due to the entrance of the skin into the gap (8) between the presser shoe (6) and the roller (3).

9 Claims, 1 Drawing Sheet

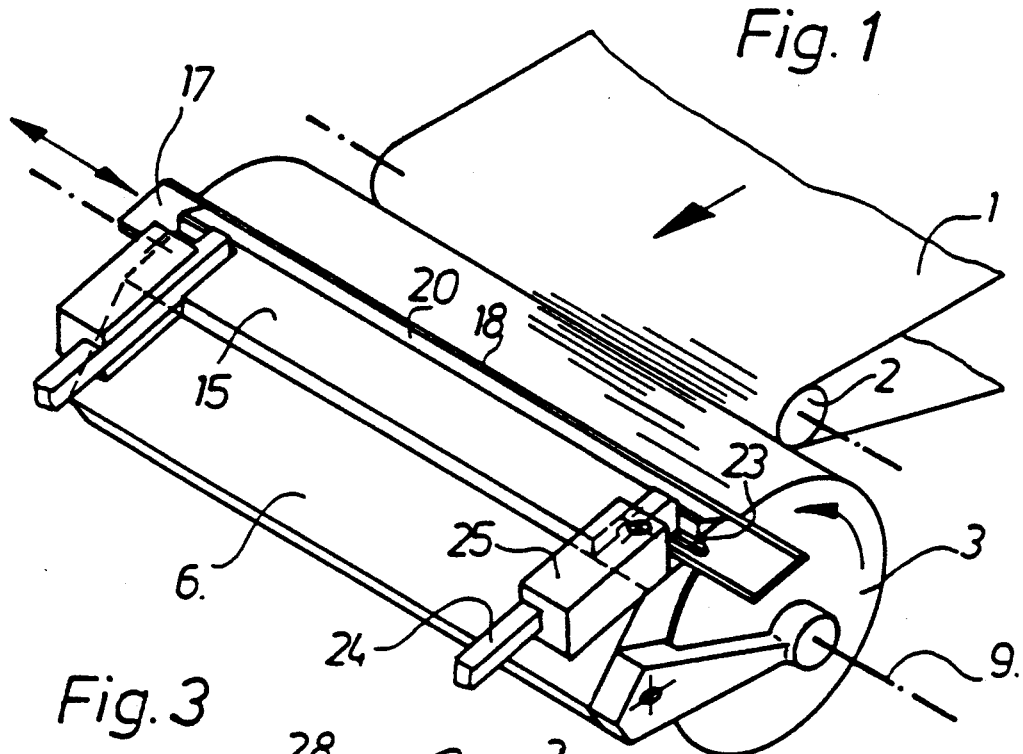
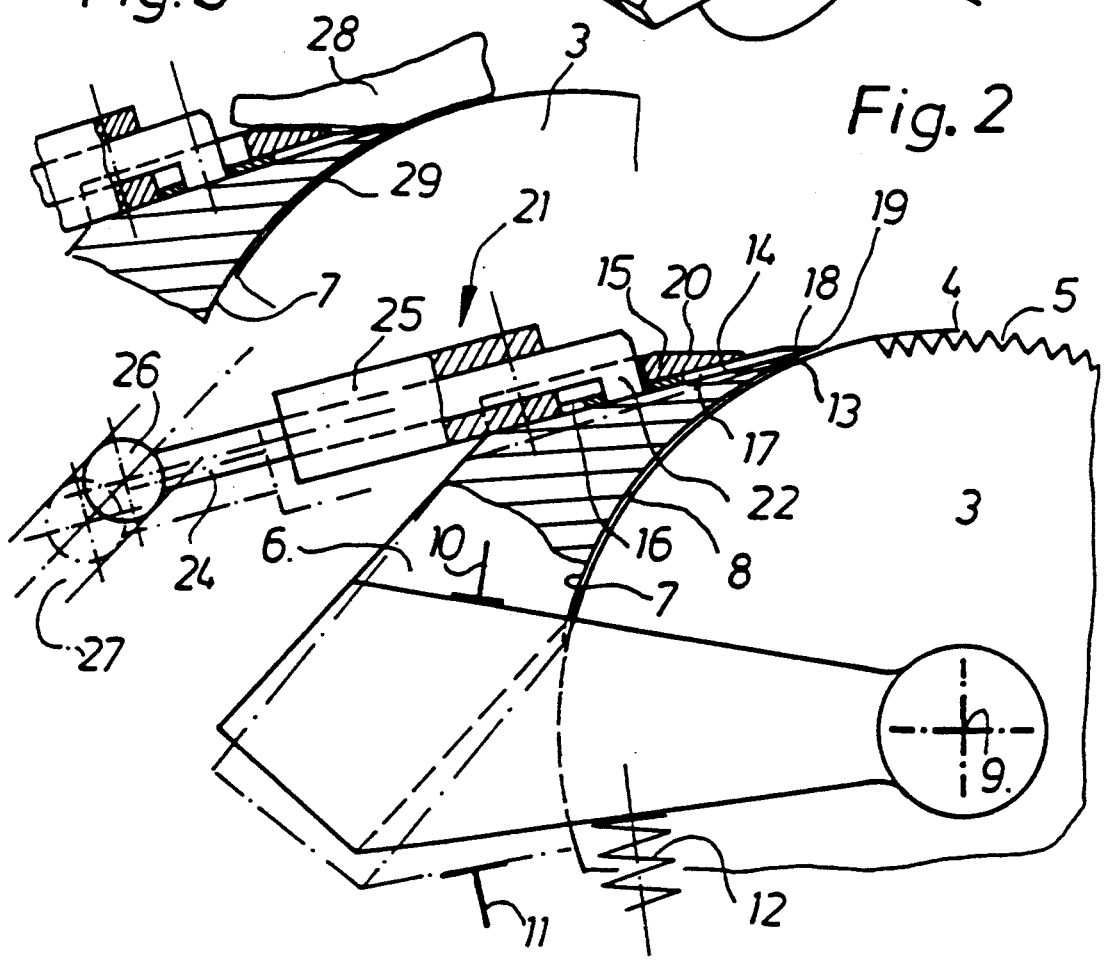

APPARATUS FOR SKINNING FISH FILLETS

BACKGROUND OF THE INVENTION

1. Field of the Invention

The invention relates to an apparatus for skinning fish fillets, comprising a skin entraining roller driven to rotate, a presser shoe having a presser face opposing the circumferential surface of the skin entraining roller and leaving a gap with respect to the roller, and a skinning knife driven to oscillate, which, with its cutting edge opposes the circumferential surface of the skin entraining roller at a distance thereto.

2. Prior Art

Such skinning apparatus is e.g. known from German Patent 37 00 324. In this known apparatus, the skinning knife is guided in a slot of the presser shoe, the position of the cutting edge being defined, relative to the blunt edge of the pressure shoe, by guiding elements in the shape of feather keys, said blunt edge confining the entrance side of the presser face. The guiding elements engage corresponding recesses in the skinning knife and ensure that the cutting edge lies slightly upstream or ahead of said pressure shoe edge.

This apparatus, which has been especially designed for the skinning of fillets of flatfish, has brought about excellent results and proved extremely reliable, because the rather intimate and strong connection of the skin with the muscle flesh which is characteristic for this species of fish and is caused by fine tendons, can be severed without problems.

However, with regard to the yield in fillet meat to be obtained with this apparatus, certain disadvantages occur in the application of this design. Such drawbacks already become apparent optically in that the so-called "silver mirror", which is a quality characteristic of skinned fillets, is missing on the skin side of the fillets. The reason for this is that this skinning procedure depends on the severing of a layer of uniform thickness including the skin, which thickness can be predetermined by setting or adjustment. By such processing it cannot be avoided that, in regions in which the skin is thinner than in other regions, a layer of meat and thus the silver mirror are severed as well.

Although it is known that the silver mirror can be maintained in the case of fillets of flatfish when using a fixedly arranged knife having a defined sharpness, no constant and reliable operation can be carried out therewith. Finally, there is a further drawback in that the tail area splits along the line of the backbone so that the skinned fillet assumes a dovetail-shaped appearance which is considered to be a quality impairment.

3. Object of the Invention

It is the main object of the present invention to remove the drawbacks of the prior art apparatus.

It is a particular object to suggest an apparatus by means of which it becomes possible to skin flatfish fillets while maintaining their silver mirror.

It is yet another important object of the invention to suggest an apparatus which safeguards that a splitting of the tail area is avoided.

SUMMARY OF THE INVENTION

In an apparatus comprising a rotating skin entraining roller, a pressure shoe with a presser face opposing the circumferential surface of the skin entraining roller and leaving a gap with respect to the roller, and an oscillating skinning knife whose cutting edge opposes the circumferential surface of the skin entraining roller at a distance thereto, these objecta are achieved in that an entrance end of the presser face is arranged as a cutting edge, which, as well as the cutting edge of the skinning knife can be displaced relative to each other such that in one end position the cutting edge of the skinning knife is arranged upstream of the cutting edge of the presser face, and that in another end position the relative position of the two cutting edges is vice versa.

According to a preferred embodiment of the apparatus designed in accordance with the present invention, these positions can be obtained in that the pressure shoe may be mounted to be pivotable about the axis of rotation of the skin entraining roller about a pivot angle which is adjustable, and that said skinning knife may be designed as a blade guided in a guiding slot formed in said presser element, said blade being provided with longitudinal recesses which are engaged by guiding means.

In such structure the guiding means may be attached to holding brackets, each of which is guided to slide in a slide guide fixedly associated with said presser shoe in the plane of the skinning knife, and engage a cam path which is arranged fixedly.

Expediently, the pivoting of said presser shoe may occur by a clamp-fitting entraining of said element when the skin to be removed enters the gap between the presser face of the presser shoe and the circumferential surface of said skin entraining roller.

The positive effect obtained by such apparatus particularly shows when the flatfish fillets to be skinned are supplied with the tail end leading, and especially resides in that the skin is detached by a "drawing" cut in the tail root area, in which there is a particularly intimate connection between the skin and the muscle meat, while the remaining fillet area is skinned with the knife being stationery, i.e. not moving.

The change-over from the one type of skinning to the other occurs automatically and its time of occurrence may be varied within certain limits in relation to the initiation of the cut by changing the force of a spring which counteracts the entraining of the pressure shoe.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

FIG. 1 shows a partial view of the apparatus according to the present invention by way of an axonometric representation in simplified manner and concentrated on the essential components, FIG. 2 shows a sectional side view of FIG. 1 on an enlarged scale and partially cut out, with the knife arrangement being in rest position, and FIG. 3 shows a section taken from FIG. 2 with the oscillating skinning knife being in its retracted position.

DETAILED DESCRIPTION OF THE PREFERRED EMBODIMENT

In a non-shown frame of a skinning machine for fish fillets, particularly flatfish fillets, there are mounted a run-off-side deflection roller 2 of an endless supply conveyor 1 as well as a skin entraining roller 3, which rollers are driven in an appropriate manner to rotate in same directions. The skin entraining roller 3 is provided, in a known per se manner with longitudinal grooves 5 on its circumferential surface 4. This surface 4 of the skin entraining roller 3 opposes, in the area of its run-off or exit side, a presser shoe 6 or similar presser element having a presser face 7, the arrangement of this opposing structure being such that a gap 8 is left between the presser face 7 and the circumferential surface 4. The radius of curvature of the presser face 7 essentially corresponds to that of the circumferential surface 4 of the skinning roller 3. The presser shoe 6 extending over essentially the whole length of the skinning roller 3 is mounted to pivot about the axis of rotation 9 of the skin entraining roller 3 the angle of pivot is confined by an upper and a lower stop or abutment 10 and 11, respectively. Springs 12, whose spring force can be adjusted in an appropriate manner, effect that the presser shoe 6 is held to lie against the upper stop 10.

The presser shoe 6 is confined in an upper direction by a back surface 14 extending parallel to the circumferential surface 4 of the skin entraining roller 3 and forming a cutting edge 13 with the upper end area of the presser face 7. The back surface 14 carries a cover 15 having a recess or offsetting which, together with the back surface 14, forms a guiding slot 16 for guiding a skinning knife 17 driven to oscillate in an appropriate manner and having the shape of a knife blade manufactured from steel band. This knife blade is provided with a cutting edge 19 resulting from an upper knife chamfer 18. The cover 15 is also provided with a chamfer or bezel 20 at its surface portion facing the skin entraining roller 3, which chamfer 20 üaractically continues the knife chamfer 18 such that the skinning knife 17 projects from the guiding slot 16 at least with its knife chanmfer 18. In relation thereto, the cutting edge 13 of the presser shoe 16 has been arranged in a forward position such that it only stands back behind the cutting edge 19 of the skinning knife 17 by a rather small extent. The skinning knife 17 is held in the described position by guiding means 21, which, by guiding elements 22, engage recesses 23 of elongated-shape formed in the skinning knife 17, these recesses being arranged in the area of the ends of the skinning knife 17 to extend in the longitudinal direction thereof. Each of the guiding elements 22 is attached to holding brackets 24, each of which is guided to slide in a sliding guide 25 which is attached to the presser shoe 6, respectively. The arrangement of the sliding guides 25 is such that the holding brackets 24 can slide in a plane which extends essentially parallel to the back surface 14. The free ends of the holding brackets 24 extending in a backward direction are each provided with a cam roller 26, each of which is guided in a cam or curved path 27 which is mounted fixedly relative to the frame.

The function of the apparatus is as follows:

A fillet 28 to be skinned is supplied with its skin side facing downwardly and its tail end leading by means of the supply belt 1 on to the circumferential surface 4 of the rotating skin entraining roller 3 and is conveyed further by this roller. During this action the tail end enters into the longitudinal grooves 5 of the skin entraining roller 3 and thus arrives underneath the cutting edge 19 of the skinning knife 17 and, shortly thereafter, with the already detached portions of the skin 29 in the gap 8 between the presser face and the circumferential surface 4 of the skin entraining roller 3, which spontaneously brings about a safe and accurate conveying engagement of the respective cut-free skin 29. In this action, the presser shoe 6, however, undergoes an entraining torque or force which, after overcoming the force of the spring 12, effects that the presser shoe 6 is entrained in a pivoting manner in the rotating direction of the skin entraining roller 3, which pivoting occurs about the axis 9 of the roller 3, which pivoting occurs about the axis of the roller 3 until the stop 11, i.e. the position shown in dash-dotted lines in FIG. 2, is reached. As can be taken from this position, such displacement of the presser shoe 6 results in that the guiding means 21 holding the skinning knife 17 in position is also displaced and that by this action the cam rollers 26 attached to the holding brackets 24 are made to move relative to the curved path 27. The thus resulting displacement of the guiding elements 22 guiding the skinning knife 17 has the effect that the skinning knife 17 is retracted to such an extent that its cutting edge 19 moves back behind the cutting edge 12 so that the latter will carry out the further skinning (see FIG. 3). When the skinning process is ended or rather after the skin 29 has left the gap 8 between the presser face 7 and the circumferential surface 4 of the skin entraining roller 3, the spring 12 effects that the presser shoe 6 is moved back into its initial position. The time of the retraction of the oscillating skinning knife 17 or the taking-over of the skinning procedure by the fixed cutting edge 13 can be defined within certain limits by changing the force of the spring 12. In this respect, a rather high degree of independency of the thickness of the skin 29 to be detached can be obtained in that the presser shoe 6 is mounted in its bearings in a non-shown conventional manner such that it can be displaced against spring force radially relative to the skin entraining roller 3 while enlarging the gap.

I claim:

1. An apparatus for detaching skin from fish fillets, said apparatus comprising
   a) an entraining roller for entraining said skin in an entraining direction, which skin entraining roller is driven to rotate and defines a circumferential surface as well as an axis of rotation;
   b) a presser element defining presser face means which define an entrance end for said skin and opposing said circumferential surface of said skin entraining roller while leaving a gap with respect thereto; and
   c) skinning knife means driven to oscillate and including a first cutting edge, which knife, with said first cutting edge opposes said circumferential surface of said skin entraining roller at a distance thereto, said entrance end of said presser face means is designed as a second cutting edge, this second cutting edge as well as said first cutting edge of said skinning knife being arranged to be displaced relative to each other such that in one end position of such relative displacement said first cutting edge is arranged upstream of said second cutting edge with respect to said entraining direction, and that in another end position of such relative displacement said second cutting edge is arranged upstream of said first cutting edge with respect to said entraining direction.

2. An apparatus as claimed in claim 1, wherein said presser element is mounted to pivot about said axis of rotation about a pivot angle which is adjustable, and wherein said skinning knife means are designed in the form of a blade defining said first cutting edge and being guided in a guiding slot formed in said presser element, said blade being provided with longitudinal recesses which are engaged by guiding means.

3. An apparatus as claimed in claim 2, further comprising at least two holding brackets and a cam path fixedly arranged in said apparatus, wherein said guiding means are mounted on said holding brackets, each of which brackets is guided to slide in a slide guide fixedly associated with said presser element in a plane defined by said skinning knife, and engage said cam path.

4. An apparatus as claimed in claim 1, wherein the pivoting of said presser element occurs by a clamp-fitting entraining of said element when the skin to be detached enters said gap between said presser face means and said circumferential surface.

5. An apparatus as claimed in claim 2, wherein the pivoting of said presser element occurs by a clamp-fitting entraining of said element when the skin to be detached enters said gap between said presser face means and said circumferential surface.

6. An apparatus as claimed in claim 3, wherein the pivoting of said presser element occurs by a clamp-fitting entraining of said element when the skin to be detached enters said gap between said pressure face means and said circumferential surface.

7. An apparatus as claimed in claim 4, wherein said presser element is supported counter to said entraining direction an adjustable spring means.

8. An apparatus as claimed in claim 5, wherein said presser element is supported counter to said entraining direction on adjustable spring means.

9. An apparatus as claimed in claim 6, wherein said presser element is supported counter to said entraining direction an adjustable spring means.

* * * * *